US011665250B2

(12) United States Patent
Amit et al.

(10) Patent No.: US 11,665,250 B2
(45) Date of Patent: May 30, 2023

(54) COINCIDENCE MAPPING

(71) Applicant: RADCOM LTD., Tel Aviv (IL)

(72) Inventors: Ram Amit, Raanana (IL); Tomer Tuvia Ilan, Rosh Haayin (IL)

(73) Assignee: Radcom Ltd., Tel Aviv (IL)

( * ) Notice: Subject to any disclaimer, the term of this patent is extended or adjusted under 35 U.S.C. 154(b) by 490 days.

(21) Appl. No.: 16/281,147

(22) Filed: Feb. 21, 2019

(65) Prior Publication Data

US 2019/0268424 A1 Aug. 29, 2019

Related U.S. Application Data

(60) Provisional application No. 62/634,881, filed on Feb. 25, 2018.

(51) Int. Cl.
| | |
|---|---|
| *G06F 15/173* | (2006.01) |
| *H04L 67/50* | (2022.01) |
| *H04L 45/00* | (2022.01) |
| *H04L 41/142* | (2022.01) |
| *H04L 41/12* | (2022.01) |

(52) U.S. Cl.
CPC ............ *H04L 67/535* (2022.05); *H04L 41/12* (2013.01); *H04L 41/142* (2013.01); *H04L 45/46* (2013.01)

(58) Field of Classification Search
CPC ....... H04L 67/22; H04L 41/12; H04L 41/142; H04L 45/46
USPC ......................................................... 709/224
See application file for complete search history.

(56) References Cited

U.S. PATENT DOCUMENTS

| | | | | |
|---|---|---|---|---|
| 9,071,683 | B1* | 6/2015 | Somes | H04M 3/42059 |
| 9,203,954 | B1* | 12/2015 | Van Rensburg | H04M 3/42042 |
| 9,264,536 | B1* | 2/2016 | Saitawdekar | H04M 3/42059 |
| 2004/0022222 | A1* | 2/2004 | Clisham | H04L 69/18 |
| | | | | 370/469 |
| 2007/0201648 | A1* | 8/2007 | Miller | H04M 15/06 |
| | | | | 379/142.01 |
| 2011/0047237 | A1* | 2/2011 | Walsh | G06Q 10/10 |
| | | | | 709/227 |
| 2011/0201320 | A1* | 8/2011 | Wosk | H04M 3/42042 |
| | | | | 455/415 |
| 2016/0150414 | A1* | 5/2016 | Flaks | H04M 3/436 |
| | | | | 455/406 |
| 2019/0114326 | A1* | 4/2019 | Agrawal | G06F 16/337 |

* cited by examiner

*Primary Examiner* — Yves Dalencourt
(74) *Attorney, Agent, or Firm* — A.C. Entis-IP Ltd.; Allan C. Entis

(57) ABSTRACT

A method of determining an identity of a called or calling user of a communication propagated over a communications network, the method comprising: determining at least one characterizing feature of an outgoing communication to a called user or an incoming communication from a calling user transmitted over the communications network that is associated with a first user; identifying an incoming or outgoing communication respectively of a second user of the communications network having a least one characterizing feature that matches the at least one characterizing feature of the outgoing or incoming communication associated with the first user; and determining an identity of the called or calling user to be that of the second user.

20 Claims, 2 Drawing Sheets

COINCIDENCE MAPPING

RELATED APPLICATIONS

The present application claims benefit under 35 U.S.C. 119(e) of U.S. Provisional Application 62/634,881 filed Feb. 25, 2018, the disclosure of which is incorporated herein by reference.

FIELD

Embodiments of the disclosure relate to methods and systems for determining users of a communications network that communicate with each other using the communications network.

BACKGROUND

Modern communications networks support a varied menu of communications transactions and may support by way of example, unicast and broadcast voice, video, videotelephony, and various forms of messaging communications, as well as transmissions of data, audio, video, and image files. To tailor services to its users and provide the users with appropriate quality of service (QoS) a communications network provider may find it advantageous to determine who communicates with whom over the network and what types of services offered by the network the users communicating with each other use.

SUMMARY

An aspect of an embodiment of the disclosure relates to providing a method of mapping encrypted communications that are engaged in by users of a communications network. An encrypted communication may be any communication, such as a unicast, broadcast, or multicast communication between two or more users of a network or networks in which an identity of at least one user at an endpoint of the communication is not known. For example, a WhatsApp, Skype, iMessage, or Telegram communication between users of a communications network may generally be considered to be an encrypted communication. Whereas the identity and other call data of a first, calling or called user, at a first endpoint, of a WhatsApp, Skype, iMessage, or Telegram communication is generally known by the network, because each of these communications formats provides end to end encryption of their respective communications, an identity of a second, called or calling user respectively, at a second endpoint of the communication is generally not known by the network. Mapping an encrypted communication between a first, known, calling or called user, and a second unknown, called or calling user respectively, comprises determining an identity for the second unknown user.

For convenience of presentation let outgoing communications transmitted by users of a communications network and incoming communications received by users of the communications network be referred to as conjugate communications. Let calling and called users be referred to as conjugate users so that a called user is a conjugate user to a calling user calling the called user, and a calling user is a conjugate user to a called user that the calling user calls. A user at an endpoint of a communication may be a person or an autonomous communications device. A communication comprises at least one communication burst which is a substantially continuous transmission of a stream of data. For a communication comprising a plurality of communication bursts, the bursts are separated by at least one transmission pause that delimits temporally adjacent bursts.

In an embodiment, determining an identity for an unidentified user at an endpoint of an encrypted communication having a known, identified user at the other endpoint of the encrypted communication comprises processing call data records for users of the network to identify at least one communication that is conjugate to and matches the communication of the encrypted communication associated with the known user. If at least one matching conjugate communication is identified, the identity of a user associated with a communication of the at least one matching conjugate communication may be determined to provide an identity for the unidentified user of the encrypted communication. Call data records processed in accordance with an embodiment to determine matching conjugate communications may comprise conventional call data records (CDRs) or enhanced call data records (eCDRs). An enhanced, eCDR, associated with an outgoing or incoming communication comprises at least one feature of a signal that encoded the communication, which may be used to characterize the signal. The at least one feature, optionally referred to as a "signal fingerprint" comprises at least one feature that characterizes a pattern of communication bursts that the communication comprises. The at least one feature may for example, comprise a length of a burst and/or a pause between bursts, a number of symbols in a burst, a number of bursts, and any correlation between bursts and/or pauses, that a communication may comprise.

Processing call data to match an identified user's communication to an unidentified user's conjugate communication optionally comprises determining that a timestamp of the conjugate communication, and optionally its duration, correspond to a timestamp and optionally duration of the identified user's communication. Optionally, matching the communications of the identified and unidentified users comprises processing signal fingerprints of the communications to determine if the fingerprints exhibit sufficient similarities to indicate that the communications encode substantially the same data. Optionally, matching signal fingerprints may be performed for situations in which conjugate signals are encrypted, compressed or otherwise processed using different encryption, compression, or processing algorithms if the fingerprints share at least one common characterizing feature.

In an embodiment, determining an identity of an unidentified user engaged in an encrypted communication with an identified user may be based on data comprised in user profiles of the users. User profile data, may comprise spatial, temporal, and/or social data that characterizes the user and may relate the user to other users of the communications network. For example, social data in a user profile that relates the user to another user may comprise data relating to kinship relationships, shared social networks, or memberships in organizations. Temporal data may comprise data indicating that the user and the other user have been in communication during a particular time window, which may by way of example be a recent time window. Spatial data may comprise data indicating that the user and other user are located in a same building, neighborhood, and/or geographical region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the following detailed description, operation of a system, hereinafter referred to as a "Matchmaker", for mapping encrypted communications in accordance with an embodiment is discussed with reference to FIG. 1, which schematically shows users of a communications network communicating using encrypted communications provided by a communications service, hereinafter referred to as a cryptic communications service. A procedure in accordance with an embodiment of the disclosure, by which a Matchmaker, such as that shown in FIG. 1, identifies an unidentified user at an endpoint of an encrypted communication and maps encrypted communications is outlined in, and discussed with reference to a flow diagram shown in FIG. 2.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1:
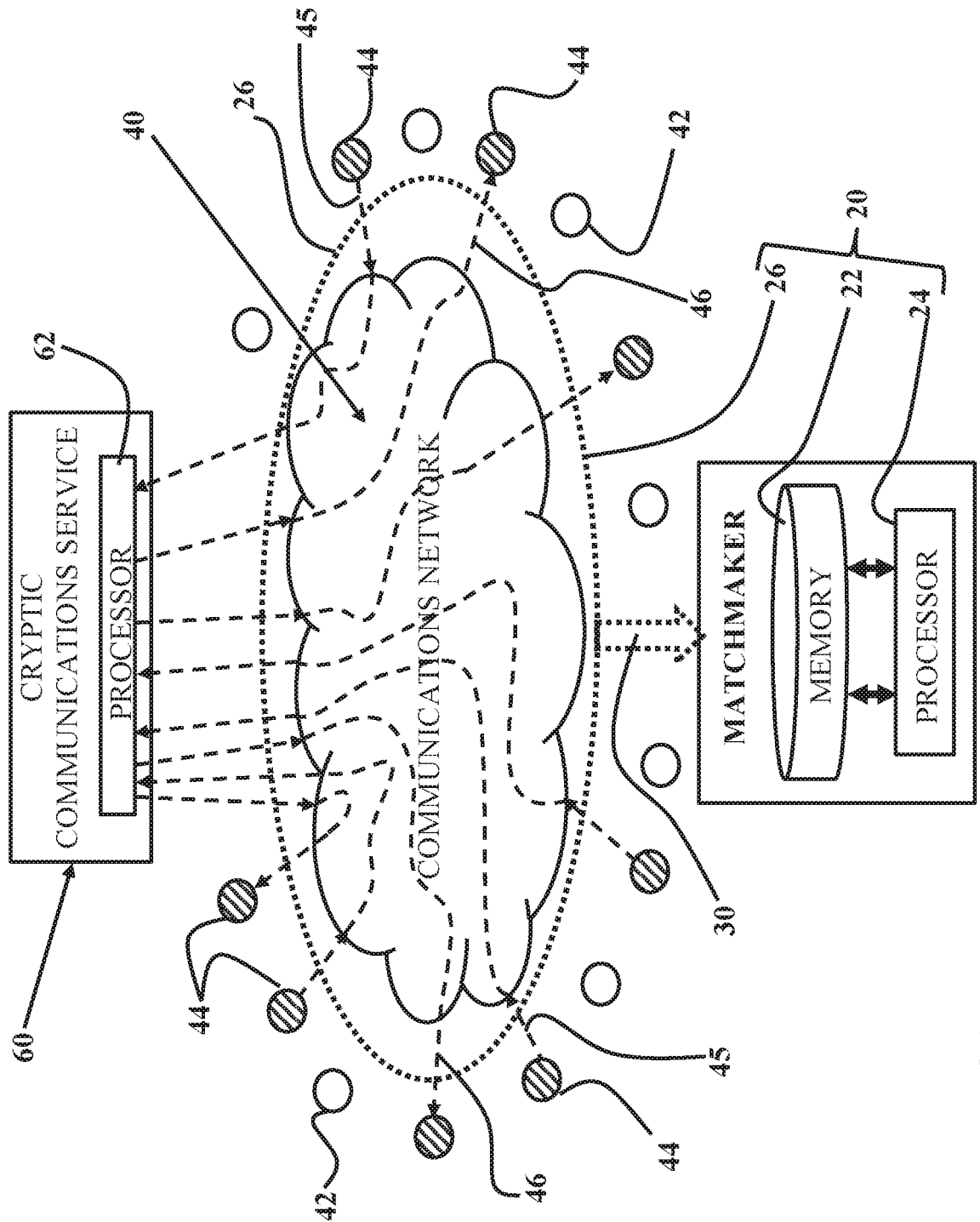
FIG. 1 schematically shows apparatus for matching users of a communications network communicating via an encrypted communication supported by the network, in accordance with an embodiment of the disclosure.

FIG. 1 schematically shows a Matchmaker 20 operating to map encrypted communications between users of a communications network 40 in accordance with an embodiment of the disclosure. Encrypted communications services are provided to the users by a cryptic communication service 60, such as by way of example, WhatsApp, Skype, iMessage, or Telegram, that is connected to the communications network. The cryptic communication service may comprise at least one processor 62 for managing, routing, and encrypting communications that it receives from and sends to users of cryptic communications service 60. Empty and patterned circles 42 and 44 schematically represent users of communications network 40. Patterned circles 44 represent users, which may be calling or called users, actively communicating with other users 44 by encrypted communication provided by cryptic communication service 60. Empty circles 42 represent users that are not using encrypted communication but may be using other communications services provided by communications network 40.

A patterned circle 44 shown with a dashed arrowed line 45 connecting the circle to cryptic communications service 60 and having arrows pointing away from the circle represents a calling user transmitting an outgoing communication, represented by line 45, of an encrypted communication to cryptic communications service 60 for processing by processor 62 and forwarding to a called user or users. A patterned circle 44 shown with a dashed arrowed line 46 connecting the circle to cryptic communications service 60 and having arrows pointing away from cryptic communications service 60 and towards the circle represents a called user receiving an incoming communication, represented by line 46, from a calling user 44 after encryption and forwarding by processor 62.

Users represented by empty circles 42 that are not engaged in encrypted communication and users 44 represented by patterned circles 44 that are engaged in encrypted communications may generically be referred to as users of communications network 40. An outgoing communication of an encrypted communication, such as outgoing communication 45, may be referred to as an outgoing encrypted communication and mapping an encrypted communication may refer to mapping an outgoing encrypted communication. Similarly, an incoming communication of an encrypted communication, such as incoming communication 46, may be referred to as an incoming encrypted communication, and mapping an encrypted communication may refer to mapping an incoming encrypted communication. It is noted that as a result of encryption provided by cryptic communications service 60 communications network 40 is unable to identify which users 44 are communicating with each other as calling and called users via a given encrypted communication provided by the cryptic communications service.

Matchmaker 20, which operates to identify an unidentified calling or called user 44 participating in an encrypted communication in accordance with an embodiment of the disclosure, optionally comprises a memory 22, a processor 24, and at least one probe represented by a dashed ellipse 26. Processor 24 comprises or has access to any combination of bare-metal and/or virtual components, any electronic and/or optical circuitry suitable for processing data, and may for example comprise any one, or any combination of more than one of, a microprocessor, an application specific circuit (ASIC), field programmable array (FPGA) and/or system on a chip (SOC). Memory 22 may comprise any combination of bare-metal and/or virtual components, any electronic and/or optical circuitry suitable for storing data and/or computer executable instructions, and may, by way of example, comprise any one or any combination of more than one of a flash memory, random access memory (RAM), read only memory (ROM), and/or erasable programmable read-only memory (EPROM). At least one probe 26 may be any suitable device that operates to retrieve desired data from user outgoing and/or incoming communications and forward the data to memory 22. Optionally at least one probe 26, processes at least a portion of the desired data to provide "derived data". At least one probe 26 may comprise any of various types of probes and may by way of example comprise at least one or any combination of more than one of a TAP (test access point), Network Packet Broker, port mirror, and any combination of bare-metal and/or virtual components required to support functionalities that the at least one probe provides.

In an embodiment at least one probe 26 monitors encrypted and, optionally, non-encrypted communications entering and exiting communications network 40 and collects and forwards data from the communications to memory 22. The forwarded data, schematically represented by a dashed block arrow 30, may comprise identity of a calling or called user of a monitored communication, a time stamp of the communication, and/or data relevant to providing at least one feature of a signal fingerprint of a signal that encodes information comprised in the communication. Optionally, data 30 comprises explicit and implicit data comprised in the communication. Explicit data, which is not generally accessible from encrypted communications, comprises information that a user consciously provides responsive to explicit requests for the information. Implicit data, which may be gleaned from both encrypted and non-encrypted communications of a user, comprises data acquired responsive to observations of a user's behavior that is not consciously generated in response to an explicit request for information. Implicit data may comprise data useable to generate statistical features that characterize a user. In an embodiment Matchmaker 20 may acquire and store in memory 22 explicit and/or implicit data relevant to a user 44 available from sources (not shown) other than probe 26 with which Matchmaker 20 may be configured to communicate. For example, the explicit and/or implicit data may be based on the user's participation in social networks, user consumer habits and purchases, and/or internet searching behavior.

It is noted that data provided by probe 26 is generally sufficient to provide an identity of a called or calling user 44 respectively receiving or transmitting an encrypted communication configured by cryptic communications service 60. However, since cryptic communication server 60 encrypts outgoing communications that calling users 44 transmit and incoming communications 46 that called users 44 receive, which calling user 44 is communicating with which called user 44 is not known. The cryptic communication service generally encrypts conjugate encrypted communications belonging to a same encrypted communication using a same encryption algorithm but different encryption keys but may encrypt conjugate communications with different encryption algorithms. As a result, an encrypted outgoing communication from a calling user to a called user is not readily identifiable with the corresponding encrypted incoming communication to the called user and therefore neither is the called user readily identifiable from their respective encrypted outgoing and incoming communications.

Matchmaker processor 24 may process data stored in memory 22 to generate CDRs and/or enhanced, eCDRs, for communications associated with users 44 that may be advantageous for matching conjugate encrypted communications propagated over communications network 40 to identify their respective conjugate users and map the communications.

In an embodiment, Matchmaker processor 24 processes explicit and/or implicit data stored in memory 22 to generate for each user of communications network 40 a user profile comprising data that may be advantageous for mapping encrypted communications 45 and 46 propagated over communications network 40 in which the user participates. The user profile may by way of example comprise data characterizing user kinship relations, and/or social networks, and/or organizations to which the user belongs. The user profile may comprise spatial information, such as locations which the user may habitually frequent, and temporal data, such as temporal patterns that might characterize the user's communications activities. The explicit data used to provide the user profile may be based on information that the user provides when registering for using services offered by the network, and explicit and/or implicit data used may be based on information available and/or determinable from the user's historical use of communications network 40 as reflected by data that CDRs and/or eCDRs comprise.

In an embodiment, Matchmaker processor 24 processes profile data to generate clusters of users of network 40 so that a cluster to which a given user belongs comprises users with whom the given user is known and/or believed to communicate, and may be used, in accordance with an embodiment of the disclosure to identify users with whom the given user may communicate in an encrypted communication. For example, a given user may be clustered with his or her family members in a "kinship cluster", clustered in a "social cluster" with members of a social network to which the given user belongs, clustered with business colleagues and associates in a "business cluster", and/or clustered in a "leisure time cluster" with patrons of a bar that the given user frequents. A probability, also referred to as a "cluster matching probability" (CMP), that a called or calling user participating in an encrypted communication with the given user may be found in a given cluster, may vary from cluster to cluster and may be dependent on features of the encrypted communication and context of the encrypted communication.

Whereas the CMP of a given cluster is expected to be a relatively strong function of a type of the cluster, for example, kinship, business, or current time, the CMP is also expected to depend upon time and/or context of an encrypted communication. For example, the leisure time "bar" cluster described above may be expected to have a very low cluster matching probability except on nights when the given user frequents the bar, and the kinship cluster might have a relatively low cluster matching probability during business hours and high cluster matching probability towards evening after hours. The kinship cluster may have a highest cluster matching probability in a context of an emergency situation such as engendered by an earthquake or terrorist attack. And a business cluster may exhibit long term changes in CMP as a result of promotion of the given user.

For a given cluster a probability, also referred to as a "user matching probability" (UMP) that a called or calling user participating in a encrypted communication with the given user may be a particular member of the cluster may vary from cluster member to cluster member. For example, for the kinship cluster a user matching probability may be greater for the given user's wife than for the given user's brother. And the UMP for a member of a given cluster may be a function of time and exhibit short term and/or long term changes with time. For example for a kinship cluster of the given user that includes the given user's wife, the wife's UMP may peak towards the end of a working day. A given user's UMPs, and CMPs, may be determined responsive to rates at which the given user is matched with other users and/or users in clusters that matchmaker generates. For example, a given user's UMP with another user may be increased or decreased if a number of matches with the other users respectively increases or decreases in a given period of time. Similarly a given users CMP for a given cluster may be increased or decreased if a number of matches with users in the given cluster increases or decreases in a given time period.

The aforementioned cluster examples, may be referred to as stable clusters for which memberships are expected to be substantially unchanged over relatively long periods of time having durations by way of example, of months or even years. However, practice of an embodiment of the disclosure is not limited to stable clusters and a given user may also be clustered in dynamic or ephemeral clusters, which are characterized by memberships that may be expected to undergo relatively rapid change. For example, a given user may be clustered with participants of a weekend convention, in a dynamic, "convention cluster", or with invitees to an opening in an ephemeral, "event cluster". An ephemeral cluster to which a given user may belong may be a "current time cluster" which by way of example, comprises users that have been in communication with the given user during a time period that extends, less than six hours into the past from the user's current time.

It is noted that a user membership in a cluster is not exclusory, and belonging to a particular cluster does not preclude a user from simultaneously belonging to another cluster. For example, a given user's family member may belong to the given user's kinship cluster, and also to a leisure time cluster, and to a current time cluster of the given user and/or of another user.

In an embodiment, Matchmaker 20 is configured to track and adjust cluster memberships and CMPs and UMPs of cluster members in response to matching conjugate users, and to identify trends in changes of CMPs and UMPs. For example, Matchmaker 20 may track changes in frequencies with which the Matchmaker finds a given user conjugate to different members of a social network and adjust the members' UMPs accordingly. Or, Matchmaker 60 may find a seasonal change in frequency with which a given user communicates with members of a given cluster and adjust the cluster's CMP to reflect the change and make the change season dependent. For example, Matchmaker 20 may determine that a given user communicates with great frequency with members of his or her golf club during the spring and summer months but with rarity during the fall and winter months. Matchmaker 20 may determine that a particular user should be added to the given user's golf club cluster upon determining that communication between the given and particular user exhibit a same seasonal dependence as between the given user and members of the golf club cluster. By way of yet another example, Matchmaker 20 may discover that a given user has a new conjugate user who might not be classified in any of the given user's clusters. In time based on statistics of matching the new conjugate user to the given user and other users of the network, Matchmaker may classify the new conjugate user as a member of one or more of the given user's clusters, such as the given user's business cluster and also in the given user's book of the month club cluster. Alternatively and/or additionally, Matchmaker 20 may create a new cluster to accommodate the new conjugate user.

Figure 2:
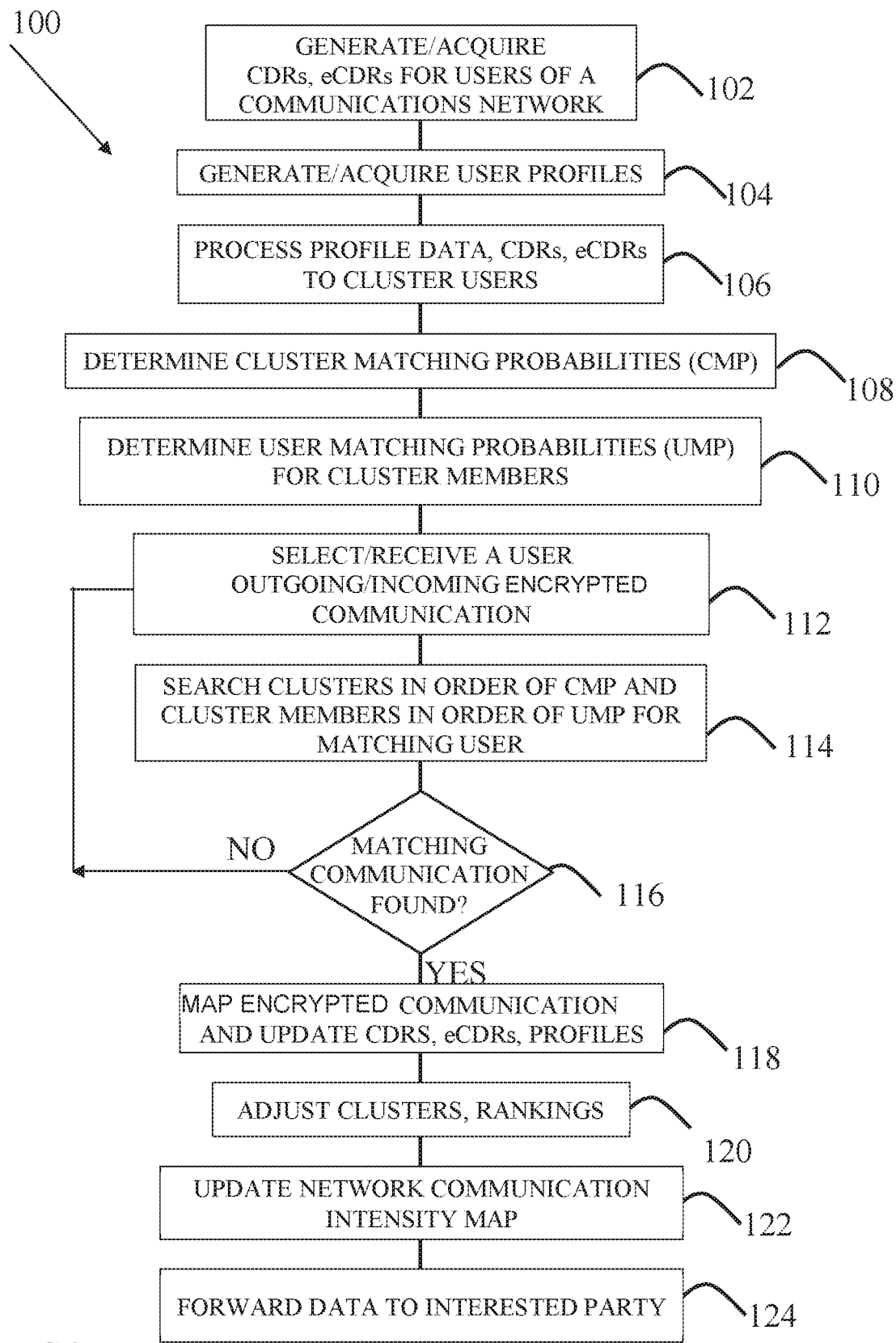
FIG. 2 shows a flow diagram of a method by which a processor may process call data records generated by a communications network to map an encrypted communication between users of the network, in accordance with an embodiment of the disclosure.

FIG. 2 shows a flow diagram 100 that outlines a procedure, also referred to by the numeral 100, by which Matchmaker 20, operates to acquire and process data stored in memory 22, such as data in CDRs, eCDRs and user profiles, to map encrypted communications, such as encrypted communications 45 and 46 (FIG. 1), propagated in communications network 40.

In a block 102 of procedure 100 Matchmaker 20 generates and/or acquires CDRs and/or eCDRs for users of the network and, optionally, in a block 104 processes the CDRs, eCDRs, explicit and/or implicit data to generate for each of the users a user profile comprising data that may be useful in mapping encrypted communications propagated over the network. Optionally, in a block 106 processor 24 of Matchmaker 20 may process data from at least one and any combination of more than one of CDRs, eCDRs and/or profile data to generate clusters of users. Any of various suitable clustering algorithms, such as by way of example K-means clustering, mean shift clustering, and/or density based spatial clustering, may be used to cluster the users In a block 108 Matchmaker 20 optionally determines cluster matching probabilities, CMPs, for the clusters associated with a given user and in a block 110 determines for members of each cluster user matching probabilities, respective UMPs.

Optionally, in a block 112 Matchmaker 20 selects or receives from memory 22 (FIG. 1) an outgoing encrypted communication 45 or incoming encrypted communication 46 (FIG. 1) associated with a given user 44 of the communications network. In a block 114 processor 24 optionally searches clusters to which the given user belongs in decreasing order of magnitude of their respective CMPs and in each cluster users in accordance with decreasing magnitude of their respective UMPs to identify a user 44 (FIG. 1) associated with a matching conjugate communication to the outgoing or incoming encrypted communication of given user 44. To determine that a user's conjugate communication matches that of the given user 44, processor 24 may require that the conjugate communication exhibits a time stamp in substantial coincidence with a time stamp of the given user's encrypted communication and duration substantially the same as that of the given user's encrypted communication. Optionally, processor 24 also requires that the conjugate communication and the incoming or outgoing encrypted communication of given user 24 are characterized by signal fingerprints that indicate the conjugate communication and incoming or outgoing communication belong to a same encrypted communication. Optionally, a signal fingerprint is configured as a feature vector, and determining that fingerprints indicate that conjugate encrypted communications belong to a same encrypted communication comprises determining that a scalar product of the two fingerprints has a magnitude greater than a threshold magnitude.

In an embodiment, processor 24 uses a neural network to search for and identify a user's conjugate communication that matches that of the given user 44. In an embodiment, the neural network is trained by supervised learning using examples of encrypted communications between known conjugate users 44 of communications network 40.

In a decision block 116 if a matching incoming communication is not found, processor 24 returns to block 112 to receive another encrypted communication for another given user. If on the other hand a matching conjugate communication is found, Matchmaker 20 proceeds optionally to a block 118 to map the given user's encrypted communication by determining an identity for the user associated with the matching communication communicating with the given user. In block 118 the Matchmaker 20 may also update a CDR, eCDR and/or profile for the given user and matching user responsive to data associated with the matching communications.

In a block 120 Matchmaker 20 optionally updates user clusters for which the mapped encrypted communication is relevant for example by updating user cluster membership, CMPs and or UMPs of members in the clusters. Optionally in a block 122 Matchmaker 20 may update a network communication intensity map that provides, optionally bandwidth usage of communication between users of the communications network. Optionally in a block 124 Matchmaker 20 transmits the identities of the matched users and details of their shared encrypted communication to a party that may be interested in the information.

It is noted that whereas FIG. 1 schematically shows Matchmaker 20 mapping encrypted communications for a single communications network 40 and FIG. 2 show a procedure 100 that appears relevant to a single communications network, practice of embodiments of the disclosure is not limited to single networks. A Matchmaker in accordance with an embodiment may provide encrypted mapping functionalities for as many networks for which the Matchmaker has access to or may generate CDRs and/or eCDRs.

It is also noted that whereas procedure 100 implements a search for a match to a given user based on decreasing cluster CMPs and decreasing users UMPs, practice of an embodiment of the disclosure is not limited to the search strategy described with reference to procedure 100 and may use any of various search strategies for identifying a conjugate communication that matches a given encrypted communication. Matchmaker 20 may for example search communication network 40 by size of communications and/or their respective time stamps. Matchmaker 20 may search network 40 randomly for a conjugate communication matching a given encrypted communication, or may search for a match by UMPs ignoring CMPs or by CMP ignoring UMPs. In an embodiment Matchmaker 20 may search clusters by an advantageous relation between clusters. For example, Matchmaker 20 may search clusters in order of a number of users they share in common, or by a feature or features they share. A feature that two clusters may share may be an interest, such as basketball or surfing, or a consumer purchase, which is common to a threshold number of members in the clusters.

It is further noted that whereas the above description discusses mapping encrypted communications, practice of methods and apparatus in accordance with an embodiment of the disclosure is not limited to encrypted communications but may be used to map non-encrypted communications. For example, communications that are not encrypted may be mapped in accordance with an embodiment of the disclosure without having to inspect the communications to determine their respective calling and/or called entities.

There is therefore provided in accordance with an embodiment of the disclosure, a method of determining an identity of a called or calling user of a communication propagated over a communications network, the method comprising: receiving a first communication transmitted over the communications network outgoing from or incoming to a known first user respectively to or from a first unknown user; receiving a second communication transmitted over the communications network respectively incoming to or outgoing from a known second user respectively from or to a second unknown user; determining at least one characteristic of the first and second communications; and based on the at least one characteristic determining that the unknown first user is the known second user. Optionally, the at least one characteristic comprises a time stamp for each of the first and second communications. Optionally, determining based on the timestamps comprises determining that the timestamp of the outgoing communication is earlier than the time stamp of the incoming communication.

In an embodiment the at least one characteristic comprises at least one feature of first and second signals that respectively encode the first and second communications. Optionally, the at least one feature of the signals comprises at least one or any combination of more than one of a number of bursts in the signals, duration of at least one burst in the signals, duration of at least one pause between bursts in the signals, and/or a respective number of symbols in at least one burst of the signals. Additionally, or alternatively, determining based on the at least one characteristic may comprise determining that the at least one characteristic of the first communication exhibits sufficient similarity to the at least one characteristic of the second communication to indicate that the communications encode substantially the same data. Optionally, determining that the at least one characteristic of the first and second communications exhibit sufficient similarities comprises determining a probability that the communications encode substantially the same data and determining that the probability is greater than a predetermined threshold probability.

In an embodiment the method comprises clustering users of the communications network to determine clusters of users that communicate with each other and using the clusters to determine that the unknown first user is the known second user. Optionally the method comprises determining a cluster matching probability (CMP) to each of a plurality of the clusters that a user communicating with the first user is a member of the cluster. Optionally the method comprises using the CMPs to determine a cluster to which the second known user belongs. The method may comprise updating CMPs responsive to determining a cluster to which the second known user belong.

In an embodiment the method comprises determining for each cluster a user matching probability (UMP) for members of the cluster that a user from the cluster communicating with the first user is the given member. The method may comprise using the UMPs to determine which of the clustered users is the second known user. Optionally, the method comprises updating UMPs responsive to determining which of the clustered users is the second known user.

In an embodiment the clusters comprise clusters based on at least one or any combination of more than one of spatial, temporal, and/or social data associated with the users.

Optionally, the method comprises dynamically updating the clusters responsive to changes in the spatial, temporal, and/or social data associated with the users.

In an embodiment the first and/or the second communication is an encrypted communication.

There is further provided in accordance with an embodiment of the disclosure apparatus for mapping communications propagated over a communications network, the apparatus comprising: at least one memory configured to receive and store data; at least one probe operable to collect data from communications entering and exiting a communications network and forward the data for storage in the memory; and a processor configured to process data stored in the memory in accordance with executable instructions to: determine at least one characteristic of a first communication outgoing from a known first user and a second communication incoming to a known second user; and based on the at least one characteristic determine that an unknown user to which the first communication is transmitted over the communications network is the known second user.

The apparatus may be a virtual apparatus. The first and/or the second communication may be an encrypted communication.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to a person of the art.

The invention claimed is:

1. A method of determining an identity of a called or calling user of a communication propagated over a communications network, the method comprising:
   receiving a first communication transmitted over the communications network outgoing from or incoming to a known first user respectively to or from a first unknown user;
   receiving a second communication transmitted over the communications network respectively incoming to or outgoing from a known second user respectively from or to a second unknown user;
   determining at least one characteristic of the first and second communications; and
   based on the at least one characteristic determining that the unknown first user is the known second user.

2. The method according to claim 1 wherein the at least one characteristic comprises a time stamp for each of the first and second communications.

3. The method according to claim 2 wherein determining based on the timestamps comprises determining that the timestamp of the outgoing communication is earlier than the time stamp of the incoming communication.

4. The method according to claim 1 wherein the at least one characteristic comprises at least one feature of first and second signals that respectively encode the first and second communications.

5. The method according to claim 4 wherein the at least one feature of the signals comprises at least one or any combination of more than one of a number of bursts in the signals, duration of at least one burst in the signals, duration of at least one pause between bursts in the signals, and/or a respective number of symbols in at least one burst of the signals.

6. Method according to claim 4 wherein determining based on the at least one characteristic comprises determining that the at least one characteristic of the first communication exhibits sufficient similarity to the at least one characteristic of the second communication to indicate that the communications encode substantially the same data.

7. The method according to claim 6 wherein determining that the at least one characteristic of the first and second communications exhibit sufficient similarities comprises determining a probability that the communications encode substantially the same data and determining that the probability is greater than a predetermined threshold probability.

8. The method according to claim 1 and comprising clustering users of the communications network to determine clusters of users that communicate with each other and using the clusters to determine that the unknown first user is the known second user.

9. The method according to claim 8 and determining a cluster matching probability (CMP) to each of a plurality of the clusters that a user communicating with the first user is a member of the cluster.

10. The method according to claim 9 and using the CMPs to determine a cluster to which the second known user belongs.

11. The method according to claim 10 and comprising updating CMPs responsive to determining a cluster to which the second known user belong.

12. The method according to claim 9 and determining for each cluster a user matching probability (UMP) for members of the cluster that a user from the cluster communicating with the first user is a given member.

13. The method according to claim 10 and using the UMPs to determine which of the clustered users is the second known user.

14. The method according to claim 13 and comprising updating UMPs responsive to determining which of the clustered users is the second known user.

15. The method according to claim 8 wherein the clusters comprise clusters based on at least one or any combination of more than one of spatial, temporal, and/or social data associated with the users.

16. The method according to claim 15 and comprising dynamically updating the clusters responsive to changes in the spatial, temporal, and/or social data associated with the users.

17. The method according to claim 1 wherein the first and/or the second communication is an encrypted communication.

18. An apparatus for mapping communications propagated over a communications network, the apparatus comprising:
   at least one memory configured to receive and store data;
   at least one probe operable to collect data from communications entering and exiting a communications network and forward the data for storage in the memory; and
   a processor configured to process data stored in the memory in accordance with executable instructions to:
      determine at least one characteristic of a first communication outgoing from a known first user and a second communication incoming to a known second user; and
      based on the at least one characteristic determine that an unknown user to which the first communication is transmitted over the communications network is the known second user.

19. The apparatus according to claim 18 configured as a virtual apparatus.

20. The apparatus according to claim 18 wherein the first and/or the second communication is an encrypted communication.

* * * * *